United States Patent
Uchida

(10) Patent No.: US 10,864,606 B2
(45) Date of Patent: Dec. 15, 2020

(54) FLUX AND SOLDER MATERIAL

(71) Applicant: KOKI COMPANY LIMITED, Tokyo (JP)

(72) Inventor: Noriyoshi Uchida, Tokyo (JP)

(73) Assignee: KOKI COMPANY LIMITED, Tokyo (JP)

( * ) Notice: Subject to any disclaimer, the term of this patent is extended or adjusted under 35 U.S.C. 154(b) by 203 days.

(21) Appl. No.: 16/312,822

(22) PCT Filed: Jun. 22, 2018

(86) PCT No.: PCT/JP2018/023757
§ 371 (c)(1),
(2) Date: Dec. 21, 2018

(87) PCT Pub. No.: WO2019/009097
PCT Pub. Date: Jan. 10, 2019

(65) Prior Publication Data
US 2020/0269362 A1    Aug. 27, 2020

(30) Foreign Application Priority Data
Jul. 3, 2017    (JP) ................................. 2017-130727

(51) Int. Cl.
*B23K 35/00*    (2006.01)
*B23K 35/362*   (2006.01)
*B23K 35/26*    (2006.01)
*B23K 35/36*    (2006.01)

(52) U.S. Cl.
CPC .......... *B23K 35/362* (2013.01); *B23K 35/262* (2013.01); *B23K 35/3618* (2013.01)

(58) Field of Classification Search
CPC ... B23K 35/362; B23K 35/364; B23K 35/368
See application file for complete search history.

(56) References Cited

U.S. PATENT DOCUMENTS

| | | | | |
|---|---|---|---|---|
| 2009/0301606 A1* | 12/2009 | Ueshima | .............. | B23K 35/262 148/24 |
| 2017/0304961 A1 | 10/2017 | Takagi et al. | | |
| 2020/0269362 A1* | 8/2020 | Uchida | ................ | B23K 35/362 |

FOREIGN PATENT DOCUMENTS

| | | |
|---|---|---|
| JP | H05318176 A | 8/1991 |
| JP | 2002146159 A | 5/2002 |
| JP | 2004018452 A | 1/2004 |

(Continued)

OTHER PUBLICATIONS

Notification of Reasons for Rejection for Japanese Patent Application No. JP 2017-130727, issued from the Japan Patent Office, date of drafting Aug. 22, 2018, with English-language translation, 4 pages.

(Continued)

*Primary Examiner* — Scott R Kastler
(74) *Attorney, Agent, or Firm* — Kilyk & Bowersox, P.L.L.C.

(57) ABSTRACT

It is an object of the present invention to provide flux and a solder material of which the activity hardly decreases even at a high temperature and which can also suppress the occurrence of migration. Flux containing an isocyanuric acid derivative containing two or more carboxyl groups and the like are provided.

7 Claims, 1 Drawing Sheet

(56) References Cited

FOREIGN PATENT DOCUMENTS

JP    2016093816 A    5/2016
WO    2017033930 A1   3/2017

OTHER PUBLICATIONS

Decision of Refusal for Japanese Patent Application No. JP 2017-130727, issued from the Japan Patent Office, date of drafting Oct. 30, 2018, with English-language translation, 4 pages.
Decision to Grant a Patent for Japanese Patent Application No. JP 2017-130727, issued from the Japan Patent Office, date of drafting Mar. 18, 2019, with English-language translation, 5 pages.
Decision to Grant for Japanese Patent Application No. JP 2017-130727, issued from the Japan Patent Office, date of drafting Mar. 18, 2019, with English-language translation, 5 pages.
Notfification of Reasons for Rejection for Japanese Patent Application No. JP 2017-130727, issued from the Japan Patent Office, dated Aug. 27, 2018, with English-language translation, 4 pages.
Notification of Final Rejection for Japanese Patent Application No. JP 2017-130727, issued from the Japan Patent Office, dated Nov. 9, 2018, with English-language translation, 4 pages.
Notification of Reasons for Rejection for Japanese Patent Application No. JP 2017-130727, issued from the Japan Patent Office, dated Aug. 27, 2018, 2 pages.
Decision of Refusal for Japanese Patent Application No. JP 2017-130727, issued from the Japan Patent Office, dated Nov. 9, 2018, 2 pages.

* cited by examiner

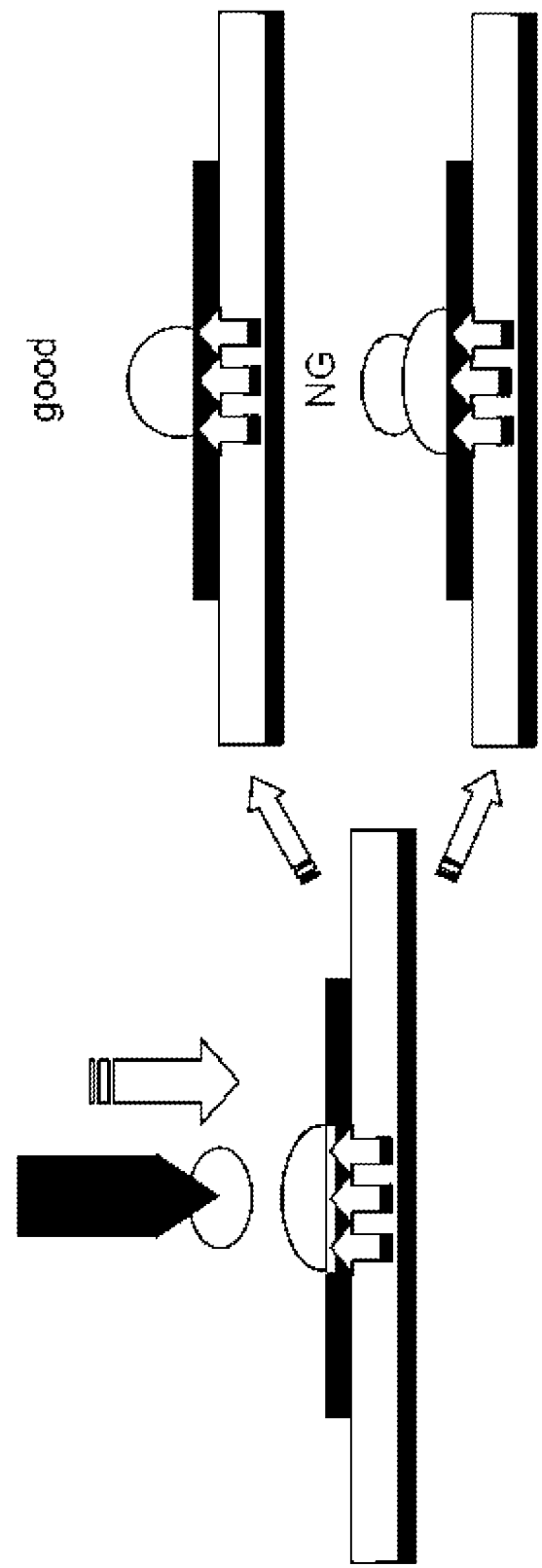

FLUX AND SOLDER MATERIAL

FIELD OF THE INVENTION

The present invention relates to flux and a solder material containing flux.

BACKGROUND TO THE INVENTION

Solder materials containing a solder alloy and flux, and the like are used in bonding of electronic parts and the like. Flux is one for improving the solderability and is one to be blended in a solder material or used together with a solder alloy. Such flux contains various kinds of components such as a resin component, an activator component, and a solvent component (Patent Documents 1 and 2). By containing an activator component, the flux suppresses the oxidation of the metal surface or the occurrence of migration and, as a result, can enhance the bonding reliability.

Meanwhile, module substrates such as a ball grid array (BGA) substrate, a chip size package (CSP) substrate, and a multi-chip module (MCM) substrate in which a large number of chips are disposed are often used along with the miniaturization and thinning of electronic devices in recent years. When such a module substrate is mounted on a printed wiring board, the solder balls and the like on the module substrate and the solder material on the printed wiring board are fused together and electrically bonded to each other as a solder material such as solder paste is disposed on a printed wiring board by printing and the like and both of these are heated at a temperature equal to or higher than the temperature at which the solder alloy in the solder material melts.

However, there is a case in which the module substrate and the substrate of the printed wiring board are warped by heat at the time of heating. The solder ball and the solder paste are put in a state of being separated from each other by the warp of the substrates, and an oxide film is likely to be formed on the surface of the solder ball by a high temperature. Meanwhile, the activating power of the flux in the solder paste also decreases by heat. Hence, even in a case in which the substrate is cooled after heating, the warp of the substrates is eliminated, and the solder ball and the solder paste are in contact with each other, the oxide film on the surface of the solder ball cannot be sufficiently removed since the activity of the flux is decreased, the solder ball and the solder paste are in an unfused state, and this results in defective bonding.

DOCUMENT FOR PRIOR ART

Patent Document 1: JP 5-318176 A
Patent Document 2: JP 2016-93816 A

SUMMARY OF THE INVENTION

Problem to be Solved by the Invention

The present invention has been made in view of the problems of the prior art as described above, and an object thereof is to provide flux and a solder material of which the activity hardly decreases even at a high temperature and which can also sufficiently suppress the occurrence of migration.

Means for Solving the Problems

The present invention relating to flux contains an isocyanuric acid derivative containing two or more carboxyl groups.

According to the present invention, the flux contains an isocyanuric acid derivative containing two or more carboxyl groups and the activity thereof hardly decrease even at a high temperature and the flux can also suppress the occurrence of migration in a case in which the flux is blended in a solder material.

In the present invention, the isocyanuric acid derivative may be at least one kind selected from the group consisting of bis(2-carboxyethyl) isocyanurate, tris(2-carboxyethyl) isocyanuric acid, and tris(3-carboxypropyl) isocyanuric acid.

The isocyanuric acid derivative may be contained in the flux at 1% by mass or more and 10% by mass or less in terms of solid matter.

The halogen concentration in the flux may be 5000 ppm or less.

The present invention relating to a solder material contains the flux described above and a solder alloy.

Effects of Invention

According to the present invention, it is possible to provide flux and a solder material of which the activity hardly decreases even at a high temperature and which can also sufficiently suppress the occurrence of migration.

BRIEF DESCRIPTION OF THE DRAWINGS

FIG. 1 is a schematic diagram which illustrates the outline of a test method.

DETAILED DESCRIPTION OF THE INVENTION

Hereinafter, the flux and solder material containing the flux according to the present invention will be described.

The flux of the present embodiment contains an isocyanuric acid derivative containing two or more carboxyl groups.

Examples of the isocyanuric acid derivative may include a compound having an isocyanuric skeleton represented by the following General Formula 1. The isocyanuric acid derivative may be used singly or in mixture of two or more kinds thereof.

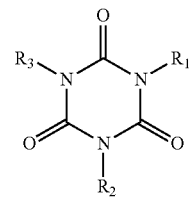

Where R1, R2, and R3 are selected from a hydrogen atom, a carboxyl group, an alkyl group having from 1 to 8 carbon atoms, or an organic group represented by —Y—X (where Y denotes an alkylene group having from 1 to 6 carbon atoms, a phenylene group or a cycloalkylene group and X denotes a carboxyl group, a hydroxyl group, an amino group, a phenyl group, or an organic group containing a phosphorus atom), R1, R2, R3 may be different from one another, and at least two carboxyl groups are contained in R1, R2, and R3.

Examples of the isocyanuric acid derivative may include a compound to be obtained from isocyanuric acid and a carboxylic acid. Examples of the isocyanuric acid derivative may include a compound to be obtained from isocyanuric acid and a carboxylic acid. Examples of these isocyanuric acid derivatives may include bis(2-carboxyethyl) isocyanurate represented by the following Formula 2 in which R1 is a hydrogen atom, R2 and R3 are an organic group represented by —X—Y, where Y is an ethylene group and X is a carboxyl group, tris(2-carboxyethyl) isocyanuric acid (tris (2-carboxyethyl) isocyanurate) represented by the following Formula 3 in which R1, R2, and R3 are an organic group represented by —X—Y, where Y is an ethylene group and X is a carboxyl group, and tris(3-carboxypropyl) isocyanuric acid (tris(3-carboxypropyl) isocyanurate), 2,4,6-trioxo-1,3, 5-triazine-1,3,5 (2H,4H,6H)-tributanoic acid represented by the following Formula 4 in which R1, R2, and R3 are an organic group represented by —X—Y, where Y is a propylene group and X is a carboxyl group.

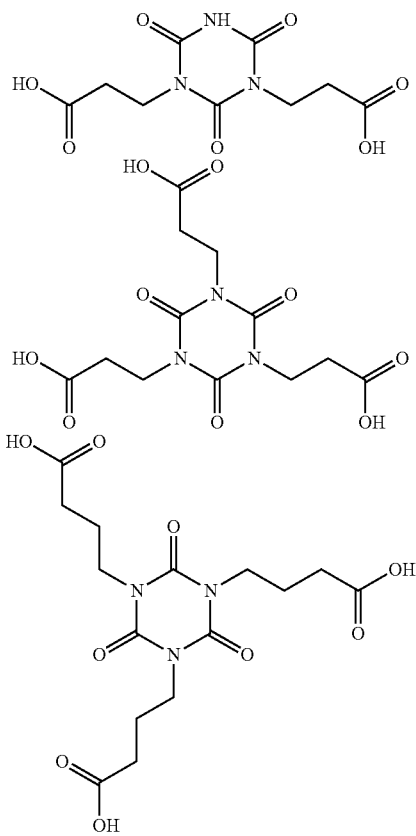

The content (in terms of solid component) of the isocyanuric acid derivative in the flux is not particularly limited, but examples thereof may include 1% by mass or more and 10% by mass or less and preferably 2% by mass or more and 8% by mass or less.

In a case in which the content of the isocyanuric acid derivative in the flux is in the above range, flux which can also further suppress the occurrence of migration while suppressing a decrease in the activating power under heating is obtained.

The flux of the present embodiment may contain known components of flux, for example, an activator component other than the isocyanuric acid derivative, a resin component, a solvent component, an antioxidant component, and a thixotropic component in addition to the isocyanuric acid derivative.

Incidentally, each of these components can be blended in the flux if necessary, and any component may or may not be contained in the flux.

The flux of the present embodiment may further contain an organic acid as an activator component other than the isocyanuric acid derivative.

The organic acid is not particularly limited as long as it is a known component to be used as an activator component of flux. Examples thereof may include glutaric acid, succinic acid, methylsuccinic acid, azelaic acid, adipic acid, sebacic acid, stearic acid, benzoic acid, dodecanedioic acid, maleic acid, and cyanuric acid.

The organic acids can be used singly or in mixture of plural kinds thereof.

The content of the organic acid in the flux is not particularly limited, but examples thereof may include 0.1% by mass or more and 20% by mass or less and preferably 1.0% by mass or more and 10% by mass or less in terms of solid matter.

In addition, examples of the content of the organic acid as a sum with the content of the isocyanuric acid derivative may include 2% by mass or more and 30% by mass or less and preferably 5% by mass or more and 20% by mass or less in terms of solid matter.

As an activator component other than the organic acid, an amine halide salt, a halogen compound and the like can be used.

Examples of the amine in the amine halide salt may include diethylamine, dibutylamine, tributylamine, diphenylguanidine, and cyclohexylamine. Examples of the halogen compound in the amine halide salt may include fluorine, chlorine, bromine, and iodine. Examples of the halogen compound may include tris(2,3-dibromopropyl) isocyanurate, 2,3-dibromo-2-butene-1,4-diol, 2-bromo-3-iodo-2-butene-1,4-diol, and TBA-bis (2,3-dibromopropyl ether).

The activators may be used singly or in mixture of plural kinds thereof.

The total content of the activator components in the flux is not particularly limited, but examples thereof may include 3% by mass or more and 30% by mass or less and preferably 5% by mass or more and 20% by mass or less in terms of solid matter.

In a case in which the amine halide salt and the halogen compound are contained in the flux of the present embodiment, the halogen concentration in the flux is preferably 5000 ppm or less and more preferably 3000 ppm or less, and examples thereof may preferably include 1500 ppm or less.

From the viewpoint of the effect of suppressing the occurrence of migration and from the viewpoint of environmental impact, it is preferable that the halogen compound is not contained (0 ppm) in the flux, but the occurrence of migration is also more likely to be suppressed as the content of the halogen compound is in the above range in a case in which the halogen compound is contained in the flux.

Incidentally, the content is preferably 1500 ppm or less in order to satisfy general halogen-free standards.

The flux of the present embodiment may contain a resin component as a rosin component.

The resin component is not particularly limited as long as it is a known resin component, such as a synthetic resin or a natural resin, to be used as a resin component of flux. Examples thereof may include polymerized rosin, hydrogenated rosin, natural rosin, disproportionated rosin, acid-modified rosin and terpene phenolic resin.

These resins can be used singly or in mixture of plural kinds thereof.

In this case, the content of the resin component in the flux is not particularly limited, but examples thereof may include 1.0% by mass or more and 80% by mass or less and preferably 10% by mass or more and 40% by mass or less in terms of solid matter.

The solvent component is not particularly limited as long as it is a known component to be used as a solvent component of flux. Examples thereof may include glycol ethers such as diethylene glycol monohexyl ether (hexyl diglycol), diethylene glycol dibutyl ether (dibutyl diglycol), diethylene glycol mono-2-ethylhexyl ether (2ethylhexyl diglycol), and diethylene glycol monobutyl ether (butyl diglycol); aliphatic compounds such as n-hexane, isohexane, and n-heptane; esters such as isopropyl acetate, methyl propionate, and ethyl propionate; ketones such as methyl ethyl ketone, methyl n-propyl ketone, and diethyl ketone; and alcohols such as ethanol, n-propanol, isopropanol, isobutanol, and octanediol.

These solvents can be used singly or in mixture of plural kinds thereof.

The content of the solvent component in the flux is not particularly limited, but examples thereof may include 20% by mass or more and 70% by mass or less and preferably 30% by mass or more and 60% by mass or less.

The antioxidant component is not particularly limited as long as it is a known component to be used as an antioxidant component of flux. Examples thereof may include a phenol-based antioxidant, a bisphenol-based antioxidant, and a polymer type antioxidant.

The content of the antioxidant in the flux is not particularly limited, but examples thereof may include 0.1% by mass or more and 50% by mass or less and preferably 1.0% by mass or more and 20% by mass or less.

The thixotropic component is not particularly limited as long as it is a known component to be used as a thixotropic component of flux. Examples thereof may include hydrogenated castor oil, fatty acid amides, oxy fatty acids, and wax.

The content of the thixotropic component in the flux is not particularly limited, but examples thereof may include 0.1% by mass or more and 50% by mass or less and preferably 1.0% by mass or more and 20% by mass or less.

The flux of the present embodiment may further contain other additives.

The flux of the present embodiment can be used as a liquid flux such as post flux, but it is also used as flux for solder materials such as solder paste and resin flux cored solder in addition to this.

The solder material of the present embodiment contains each of the flux described above and a solder alloy.

The solder alloy may be a lead-free alloy.

The solder alloy is not particularly limited, and it may be either of a lead-free solder alloy (not containing lead) or a leaded solder alloy, but a lead-free solder alloy is preferable from the viewpoint of environmental impact.

Specific examples of the lead-free solder alloy may include alloys containing tin, silver, copper, zinc, bismuth, antimony, indium and the like, and more specific examples thereof may include alloys such as Sn/Ag, Sn/Ag/Cu, Sn/Cu, Sn/Ag/Bi, Sn/Bi, Sn/Ag/Cu/Bi, Sn/Sb, Sn/Zn/Bi, Sn/Zn, Sn/Zn/Al, Sn/Ag/Bi/In, Sn/Ag/Cu/Bi/In/Sb, and In/Ag. In particular, Sn/Ag/Cu is preferable.

The content of the solder alloy in the solder material is not particularly limited, but examples thereof may include 80% by mass or more and 95% by mass or less and preferably 85% by mass or more and 90% by mass or less.

In a case in which the solder material of the present embodiment is resin flux cored solder having a linear solder alloy of which the interior is filled with flux, it is preferable that the solder material is configured to contain the solder alloy at 95% by mass or more and 99% by mass or less and preferably 96% by mass or more and 98% by mass, for example.

In a case in which the solder material of the present embodiment is solder paste to be obtained by mixing the solder alloy with the flux of the present embodiment described above, it is preferable that the solder alloy is mixed at 80% by mass or more and 95% by mass or less and the flux is mixed at 5% by mass or more and 20% by mass or less, for example.

The solder material of the present embodiment can be configured as a known solder material such as solder paste, bar solder, or resin flux cored solder.

The flux and solder material of the present embodiment can also suppress the occurrence of migration and the activity thereof does not decrease even at a high temperature.

It is possible to effectively suppress the formation of an oxide film on the surface of the solder ball even when the module substrate and the substrate of the printed wiring board are warped by heat and the solder ball of the module substrate and the solder paste of the printed wiring board are in a state of being separated from each other particularly when a module substrate such as a BGA substrate, a CSP substrate, or a MCM substrate is mounted on a printed wiring board. Consequently, it is possible to suppress the occurrence of defective bonding due to an unfused state when the warp is eliminated, and the solder ball and the solder paste are in a state of being bonded to each other after heating.

Particularly in a case in which a lead-free solder alloy is used as a solder alloy, heating at a relatively high temperature is often conducted since the melting point of the lead-free solder alloy is higher than that of a solder alloy containing lead and heating at such a high temperature is likely to further decrease the activity of the flux. However, it is possible to suppress a decrease in the activity even by heating at a relatively high temperature in the case of using the flux of the present embodiment.

The flux and solder material of the present embodiment can maintain high activating power even under heating at a high temperature. Hence, it is possible to obtain flux exhibiting high activating power even without using a halogen compound-based activator conventionally used or using a halogen compound-based activator at a low concentration. In addition, it is possible to further suppress the occurrence of migration since it is not required to use a halogen compound.

Furthermore, flux and solder material of the present embodiment are preferable from the viewpoint of environmental impact as well since these exhibit high activating power under heating at a high temperature even when being obtained without using a halogen compound or using a halogen compound at a low concentration.

The flux and solder material according to the present embodiment are as described above, but it should be considered that the embodiment disclosed this time is an example in all respects and it is not restrictive. The scope of the present invention is indicated not by the above description but by the claims, and it is intended to include all changes within the meanings and scope equivalent to the claims.

Examples

Next, Examples of the present invention will be described together with Comparative Examples. It should be noted that the present invention is not construed as being limited to the following Examples.

Fabrication of Flux

Flux to be used in the respective Examples and Comparative Examples were fabricated by blending the materials as to be described below at the proportions presented in Table 1.

As the fabrication method, the respective materials were put in a suitable vessel and mixed at room temperature until all the materials were uniformly dissolved, thereby obtaining flux.

Materials of Flux
Rosin component
Acrylic acid-modified rosin (manufactured by ARAKAWA CHEMICAL INDUSTRIES, LTD.)
Hydrogenated rosin (manufactured by ARAKAWA CHEMICAL INDUSTRIES, LTD.)
Solvent component
Hexyl diglycol (manufactured by NIPPON NYUKAZAI CO., LTD.)
Thixotropic agent
Bisamide-based thixotropic agent (manufactured by Nippon Kasei Chemical Co., Ltd.)
Activator component (all manufactured by Tokyo Chemical Industry Co., Ltd.)
Bis(2-carboxyethyl) isocyanurate
Tris(2-carboxyethyl) isocyanurate
Tris(3-carboxypropyl)isocyanurate
Tris(2,3-dibromopropyl) isocyanurate
Trans-2.3-Dibromo-2-butene-1,4-diol
Glutaric acid
Succinic acid
Methylsuccinic acid
Azelaic acid Solder Paste A solder alloy powder (SAC305, average: 30 μm, S3X58 manufactured by KOKI Company Ltd.) and each of the flux were mixed at a ratio of 88±1% by mass to 12±1% by mass, thereby fabricating each paste-like solder material (solder paste).

Heat Resistance Test

The heat resistance test was conducted using the above solder materials of Examples and Comparative Examples by the following method.

Each of the solder pastes was printed on a pad of a test substrate (FR-4 substrate, evaluation pad: 0.8 mm φ CSP) and the pad was placed on a solder bath heated at 280° C. to melt the solder paste.

After the solder paste was melted, solder balls (0.76 mm, SAC305 balls) were placed on the evaluation pad every 10 seconds, and the time required until the solder paste and the solder ball did not merge with each other any longer was measured. The outline of the test method is as illustrated in FIG. 1.

The judgment on merging was visually made. The results are presented in Table 1.

Migration Test

The migration test was conducted using the solder paste of each Example and Comparative Example by a method conforming to IPC TM-650 2.6.14.1. Incidentally, the bias application time during the test was set to 296 hours.

The filament growth and discoloration and corrosion on the test substrate after the test were observed under an optical microscope at a 10-fold magnification.

Incidentally, those without filament growth and discoloration and corrosion were evaluated as G (Good) and those with filament growth and discoloration and corrosion were judged as NG (No good). The results are presented in Table 1.

TABLE 1

| Components of flux | | Example 1 | Example 2 | Example 3 | Example 4 | Example 5 | Example 6 | Comparative Example 1 |
|---|---|---|---|---|---|---|---|---|
| Rosin component | KE-604(acrylic acid-modified rosin) | 30% | 30% | 30% | 30% | 30% | 30% | 30% |
| | KR-612(hydrogenated rosin) | 10% | 10% | 10% | 10% | 10% | 10% | 10% |
| Solvent component | HeDG(hexyl diglycol) | 46% | 46% | 46% | 49% | 43% | 48.5% | 49% |
| Thixotropic agent | SLIPAX ZHH (bisamide-based thixotropic agent) | 7% | 7% | 7% | 7% | 7% | 7% | 7% |
| Activator component | Bis(2-carboxyethyl) isocyanurate | 5.0% | | | | | | |
| | Tris(2-carboxyethyl) isocyanurate | | 5.0% | | | | | |
| | Tris(3-carboxypropyl) isocyanurate | | | 5.0% | 2.0% | 8.0% | 2.0% | |
| | Tris(2,3-dibromopropyl) isocyanurate | | | | | | | 2.0% |
| | trans-2,3-Dibromo-2-butene-1,4-diol | | | | | | 0.5% | |
| | Glutaric acid | 2.0% | 2.0% | 2.0% | 2.0% | 2.0% | 2.0% | 2.0% |
| | Succinic acid | | | | | | | |
| | Methylsuccinic acid | | | | | | | |
| | Azelaic acid | | | | | | | |
| | Sum | 100% | 100% | 100% | 100% | 100% | 100% | 100% |
| | Content of flux | 12% | 12% | 12% | 12% | 12% | 12% | 12% |
| | Solder powder (SAC305 average: 30 μm) | 88% | 88% | 88% | 88% | 88% | 88% | 88% |
| | Results for heat resistance test | 45 s | 45 s | 60 s | 45 s | 60 s | 50 s | 50 s |
| | Halogen concentration (ppm) | 0 | 0 | 0 | 0 | 0 | 3250 | 13160 |
| | Presence or absence of halogen (silver chromate method) | G | G | G | G | G | NG | NG |
| | Results for migration test | G | G | G | G | G | G | NG |

TABLE 1-continued

| | Components of flux | Comparative Example 2 | Comparative Example 3 | Comparative Example 4 | Comparative Example 5 | Comparative Example 6 |
|---|---|---|---|---|---|---|
| Rosin component | KE-604(acrylic acid-modified rosin) | 30% | 30% | 30% | 30% | 30% |
| | KR-612(hydrogenated rosin) | 10% | 10% | 10% | 10% | 10% |
| Solvent component | HeDG(hexyl diglycol) | 49% | 46% | 46% | 46% | 51% |
| Thixotropic agent | SLIPAX ZHH (bisamide-based thixotropic agent) | 7% | 7% | 7% | 7% | 7% |
| Activator component | Bis(2-carboxyethyl) isocyanurate | | | | | |
| | Tris(2-carboxyethyl) isocyanurate | | | | | |
| | Tris(3-carboxypropyl) isocyanurate | | | | | |
| | Tris(2,3-dibromopropyl) isocyanurate | | | | | |
| | trans-2.3-Dibromo-2-butene-1,4-diol | 2.0% | | | | |
| | Glutaric acid | 2.0% | 2.0% | 2.0% | 2.0% | 2.0% |
| | Succinic acid | | 5.0% | | | |
| | Methylsuccinic acid | | | 5.0% | | |
| | Azelaic acid | | | | 5.0% | |
| | Sum | 100% | 100% | 100% | 100% | 100% |
| | Content of flux | 12% | 12% | 12% | 12% | 12% |
| | Solder powder (SAC305 average: 30 μm) | 88% | 88% | 88% | 88% | 88% |
| | Results for heat resistance test | 45 s | 35 s | 25 s | 35 s | 10 s |
| | Halogen concentration (ppm) | 13000 | 0 | 0 | 0 | 0 |
| | Presence or absence of halogen (silver chromate method) | NG | G | G | G | G |
| | Results for migration test | NG | G | G | G | G |

Presence or Absence of Halogen

The halogen in the flux of each Example and Comparative Example was measured by a method (Silver Chromate Method) conforming to IPC TM-650 2.3.33.

After the test, the silver chromate test paper was visually observed to examine discoloration.

Incidentally, those without discoloration were judged as G (Good) and those with discoloration were judged as NG (No good).

In addition, the halogen concentration in each flux was measured (calculated). The results are presented in Table 1.

As presented in Table 1, the solder materials of Examples exhibited favorable heat resistance, that is, the time required until the solder ball and the solder paste did not merge with each other any longer was relatively long, and the occurrence of migration was not observed from the solder materials.

On the other hand, in a case in which a halogen compound was used as an activator, the solder materials of Comparative Examples exhibited relatively favorable heat resistance, but the occurrence of migration was not able to be suppressed. In addition, in a case in which carboxylic acid was used as an activator, the occurrence of migration was able to be suppressed but the time required until the solder ball and the solder paste did not merge with each other any longer was shorter as compared with that in Examples and thus the heat resistance was low. In other words, in Comparative Examples, it was impossible to obtain both favorable heat resistance and a favorable migration suppressing effect.

What is claimed is:

1. A flux comprising a solvent component, a rosin component, and an activator component, wherein the activator component includes an isocyanuric acid derivative containing two or more carboxyl groups, wherein the solvent component is contained at 20% by mass or more and 70% by mass or less, the rosin component is contained at 1.0% by mass or more and 80% by mass or less, and a halogen concentration in the flux is 5000 ppm or less.

2. The flux according to claim 1, wherein the isocyanuric acid derivative is at least one kind selected from the group consisting of bis(2-carboxyethyl) isocyanurate, tris(2-carboxyethyl) isocyanuric acid, and tris(3-carboxypropyl) isocyanuric acid.

3. The flux according to claim 1, wherein the isocyanuric acid derivative is contained in the flux at 1% by mass or more and 10% by mass or less in terms of solid matter.

4. The flux according to claim 1, wherein the halogen concentration in the flux is 3000 ppm or less.

5. A solder material comprising the flux according to claim 1 and a solder alloy.

6. The flux according to claim 1, wherein the halogen concentration in the flux is 1500 ppm or less.

7. The flux according to claim 1, wherein the halogen concentration in the flux is 0 ppm.

* * * * *